(12) United States Patent
 Zhou

(10) Patent No.: US 11,719,994 B2
(45) Date of Patent: Aug. 8, 2023

(54) MULTI-MODE RECEPTION MINIATURISED ENTANGLEMENT SOURCE SYSTEM BASED ON PPKTP CRYSTAL

(71) Applicant: JINAN INSTITUTE OF QUANTUM TECHNOLOGY, Jinan (CN)

(72) Inventor: Fei Zhou, Jinan (CN)

(73) Assignee: JINAN INSTITUTE OF QUANTUM TECHNOLOGY, Jinan (CN)

( * ) Notice: Subject to any disclaimer, the term of this patent is extended or adjusted under 35 U.S.C. 154(b) by 0 days.

(21) Appl. No.: 18/014,748

(22) PCT Filed: Aug. 19, 2021

(86) PCT No.: PCT/CN2021/113428
§ 371 (c)(1),
(2) Date: Jan. 6, 2023

(87) PCT Pub. No.: WO2022/048447
PCT Pub. Date: Mar. 10, 2022

(65) Prior Publication Data
US 2023/0194955 A1  Jun. 22, 2023

(30) Foreign Application Priority Data

Sep. 7, 2020  (CN) .......................... 202010931398.6

(51) Int. Cl.
*G02F 1/39*  (2006.01)
*G02F 1/355*  (2006.01)
*G02F 1/35*  (2006.01)

(52) U.S. Cl.
CPC ............ *G02F 1/395* (2013.01); *G02F 1/3503* (2021.01); *G02F 1/3526* (2013.01); *G02F 1/3553* (2013.01); *G02F 1/3558* (2013.01)

(58) Field of Classification Search
None
See application file for complete search history.

(56) References Cited

U.S. PATENT DOCUMENTS 7,570,365 B2 * 8/2009 Trifonov ................ G02F 1/395
356/480

FOREIGN PATENT DOCUMENTS

CN   108462026 A   8/2018
CN   108844464 A   11/2018
(Continued)

OTHER PUBLICATIONS

T. Zhong, F. N. C. Wong, A. Restelli and J. C. Bienfang, "Efficient single-spatial-mode PPKTP waveguide source for high dimensional entanglement-based QKD," 2012 Conference on Lasers and Electro-Optics (CLEO), San Jose, CA, USA, 2012, pp. 1-2. (Year: 2012).*

(Continued)

*Primary Examiner* — Rhonda S Peace
(74) *Attorney, Agent, or Firm* — Kilpatrick Townsend & Stockton, LLP

(57) ABSTRACT

A miniaturized PPKTP crystal-based entanglement source system using multi-mode reception is provided, which includes a pump light source, a pump light transmission module, an entanglement device, a first collection device, and a second collection device. In the entanglement source system, entangled lights are received by using multi-mode optical fibers, and an entangled light processing scheme of combining a temporal filtering technology and a spatial filtering technology is applied into a collecting device at one side of the entanglement source system, to form asymmetric device structures in the entanglement source system, to enable multi-mode reception.

10 Claims, 4 Drawing Sheets

(56) References Cited

FOREIGN PATENT DOCUMENTS

| CN | 110716365 A | 1/2020 |
| CN | 112130396 A | 12/2020 |
| JP | 2014170169 A | 9/2014 |

OTHER PUBLICATIONS

S. K. Josh, F. Anger, A. Lamas-Linares and C. Kurtsiefer, "Narrowband PPKTP source for entangled polarization photons," 2011 Conference on Lasers and Electro-Optics Europe and 12th European Quantum Electronics Conference (CLEO EUROPE/EQEC), Munich, Germany, 2011, pp. 1-1. (Year: 2011).*

* cited by examiner

MULTI-MODE RECEPTION MINIATURISED ENTANGLEMENT SOURCE SYSTEM BASED ON PPKTP CRYSTAL

CROSS REFERENCE TO RELATED APPLICATIONS

This application is the national phase of International Patent Application No. PCT/CN2021/113428, titled "MULTI-MODE RECEPTION MINIATURISED ENTANGLEMENT SOURCE SYSTEM BASED ON PPKTP CRYSTAL", filed on Aug. 19, 2021, which claims the priority to Chinese Patent Application No. 202010931398.6, titled "MULTI-MODE RECEPTION MINIATURISED ENTANGLEMENT SOURCE SYSTEM BASED ON PPKTP CRYSTAL", filed on Sep. 7, 2020 with the Chinese Patent Office, both of which are incorporated herein by reference in their entireties.

FIELD

The present disclosure relates to the field of quantum information, and in particular, to a miniaturized PPKTP crystal-based entanglement source system using multi-mode reception.

BACKGROUND

The concept of quantum entanglement was first proposed by Erwin Schrödinger based on the well-known EPR paradox, which has been a research hotspot of subjects such as physics and information communication in recent years. Due to the special features of quantum entanglement, quantum entanglement has been significantly applied to several aspects, such as quantum computing, quantum secret communication, and quantum teleportation. To date, entangled states may be formed in cavities QED, ion traps, quantum dots and other systems. Since high-rate and high-brightness are most easily achieved at an entangled state in an optical system, the entangled state in an optical system has been widely applied and researched.

By far, the most well-developed method is to generate an entangled photon pair by a spontaneous parametric down-conversion (SPDC) process in a nonlinear crystal, for example, reference may be made to Chinese Patent Applications No. 201721027813.5 and No. 201110170177.2. SPDC is realized by parametric oscillation of a strong pump light in a nonlinear medium with spontaneous radiation caused by quantum vacuum noises, that is, one high-frequency pumping photon is spontaneously split into a pair of low-frequency down-conversion photons at a probability, namely a signal photon and an idler photon. Later, a solution for generating an entangled photon pair by using a periodically polarized nonlinear crystal such as Periodically Poled KTiOPO4 (PPKTP) and Periodically Poled LiNbO3 (PPLN) through a quasi-phase matching technique is provided, for example, reference may be made to Chinese Patent Application No. 201810955748.5. A Quasi-phase matching (QPM) technology is used for compensating for phase mismatch between light waves due to refractive index dispersion by periodically modulating the nonlinear polarizability of an optical crystal.

A conventional method of preparing a nonlinear entanglement source is to perform parameter down conversion by using a barium borate (BBO) nonlinear crystal, and perform lateral and longitudinal walk-off effect compensation through a thin crystal and a wave plate, to generate a good entanglement source. In 2004, scientists from Massachusetts Institute of Technology further greatly increased the brightness of the entanglement source by using the Periodically Poled KTiOPO4 (PPKTP) crystal. Under laboratory conditions, the brightness of the entanglement source has reached a good effect by using the PPKTP crystal with the Sagnac interference ring technology. In recent years, the PPKTP crystal-based entanglement source with the quasi-phase matching technology has become an excellent choice for achieving high-brightness and high-quality.

Therefore, in the existing technology, some PPKTP crystal-based entanglement source systems are successively proposed. For example, some entangled source structures are disclosed in the Chinese Patent Application No. 201810955748.5, as shown in FIG. 1. A PPKTP crystal-based entangled source structure is disclosed in the document "High Brightness Entanglement Source Development based on Periodically Poled KTiOPO4 Crystals" (Physics Report), where a pair of parametric lights orthogonal in the polarization direction is generated in the PPKTP crystal, the pump light is separated from the parametric light by using a dichroic mirror and a long pass filter, and a pair of parametric photons are separated from each other by using PBS and coupled into a single-mode optical fiber. In this way, the brightness of the entangled source structure is an order of magnitude greater than that of a conventional BBO-based entangled light source, as shown in FIG. 2. A PPKTP crystal-based entanglement source structure is disclosed in the document "A Mobile Integrated Entanglement Source based on Hundred kilometers Quantum Communication Experiment", with which the brightness of an entanglement source based on a BBO crystal can be increased to 1000 cps/MW by using spatial filtering and pattern matching technology. However, a quantum entanglement source system provided in the above solution still cannot obtain expected polarization contrast and brightness. The PPKTP crystal-based entanglement source structure shown in FIG. 3 can increase the brightness by more than one order of magnitude.

By analyzing the conventional solutions, it can be found that the existing polarization entanglement source system based on the PPKTP crystal is insufficient in aspects such as output optical performance (such as polarization contrast, brightness, and quality), performance stability, economy, which needs to be improved.

For example, an existing entanglement source system generally receives an entangled light by using a single mode optical fiber. However, the single-mode optical fiber has a high cost and high-power consumption, and the single-mode optical fiber is sensitive for bending and thus has a high requirement on welding, and the single-mode optical fiber is easy to generate additional loss and thus has a high requirement on cleaning. Further, since the collection devices on both sides have completely symmetrical device structures in the conventional art, there are too many devices arranged in the system, causing a waste of resources to a certain extent. The above-mentioned problems, especially in experiments and education environments, result in unstable output optical performance and economic issue of the system. In addition, the entangled light outputted from the collection device still needs to be improved in terms of polarization contrast, brightness and quality.

SUMMARY

In view of the above-mentioned deficiencies in the conventional art, a miniaturized PPKTP crystal-based entanglement source system using multi-mode reception is provided according to the present disclosure, in which entangled lights are received by using multi-mode optical fibers, and for which an entangled light processing scheme of combining a temporal filtering technology and a spatial filtering technology is applied into a collecting device at one side of the entanglement source system, to form asymmetric device structures in the entanglement source system, to implement the entanglement source using multi-mode reception while improving polarization contrast, brightness and quality, as well as stability and economy of the entanglement source.

In one embodiment, the miniaturized PPKTP crystal-based entanglement source system using multi-mode reception according to the present disclosure may include a pump light source 1, a pump light transmission module, an entanglement device 4, a first collection device 5-1, and a second collection device 5-2.

A light outputted from the pump light source 1 is processed by the pump light transmission module, and is inputted to the entanglement device 4 as a pump light.

The entanglement device 4 is configured to generate an entangled light based on the pump light by using the PPKTP crystal, where the entangled light includes a signal light and an idler light, and polarization directions of the signal light and the idler light are orthogonal to each other.

The first collection device 5-1 is configured to receive one of the signal light and the idler light. The second collection device 5-2 is configured to receive the other of the signal light and the idler light.

The first collection device 5-1 and the second collection device 5-2 are structurally asymmetric. A temporal filter unit 6 and a spatial filter unit 8 are arranged in the first collection device 5-1, and the temporal filter unit 6 is arranged before the spatial filter unit 8. A spatial filter unit 9 is arranged in the second collection device 5-2. The first collection device 5-1 further includes a first multi-mode optical fiber, and the second collection device 5-2 further includes a second multi-mode optical fiber.

In one embodiment, the temporal filter unit 6 includes a narrowband filter, and/or the spatial filter units 8, 9 each includes a diaphragm.

Further, the first collection device 5-1 further includes a collimation unit 10 for collimating the signal light or the idler light, and/or the second collection device 5-2 further includes a collimation unit 11 for collimating the signal light or the idler light. In one embodiment, the second collection device 5-2 further includes a stray light filter unit 7 for filtering out stray lights other than the signal light or the idler light.

In one embodiment, at least one of the first and the second multi-mode optical fiber is a 105-micron core multi-mode optical fiber. In one embodiment, the wavelength of the pump light is 405 nm. In one embodiment, the narrowband filter has a center wavelength of 810 nm and a full width at half maximum of 5 nm. In one embodiment, the diaphragm has an aperture of 1.5 mm.

Further, the pump light transmission module includes a collimating device 2 and a focusing device 3.

In one embodiment, the collimating device 2 includes a collimating lens, and/or the focusing device 3 includes a focusing lens.

Further, the entanglement device 4 includes a first optical element 4-1 and a Sagnac interference ring structure 4-2. The first optical element 4-1 is configured to transmit a pump light and reflect an entangled light. The Sagnac interference ring structure 4-2 is configured to generate the entangled light based on the pump light by using the PPKTP crystal.

In one embodiment, the first optical element 4-1 includes a dichroic mirror; and/or the Sagnac interference ring structure 4-2 includes a dual-wavelength polarizing beam splitter 4-2-1, a dual-wavelength half-wave plate 4-2-4, a first dual-wavelength reflector 4-2-2, a second dual-wavelength reflector 4-2-3 and a PPKTP crystal 4-2-5.

Further, the entanglement source system of the present disclosure may further include a measurement device, the measurement device is arranged between the entanglement device 4 and the collection devices 5-1, 5-2.

There may be one, two, or more diaphragms in each of the first collection device 5-1 and the second collection device 5-2.

BRIEF DESCRIPTION OF THE DRAWINGS

The embodiments of the present disclosure will be described in detail below in conjunction with the drawings.

In order to clearly illustrate the embodiments of the present disclosure, the drawings required in the description of the embodiments will be briefly introduced here. Apparently, the drawings in the following description merely show some embodiments of the present disclosure.

DETAILED DESCRIPTION OF THE EMBODIMENTS

Hereinafter, exemplary embodiments of the present disclosure will be described in detail with reference to the drawings. The present disclosure is not limited to the embodiments disclosed herein.

Figure 1:
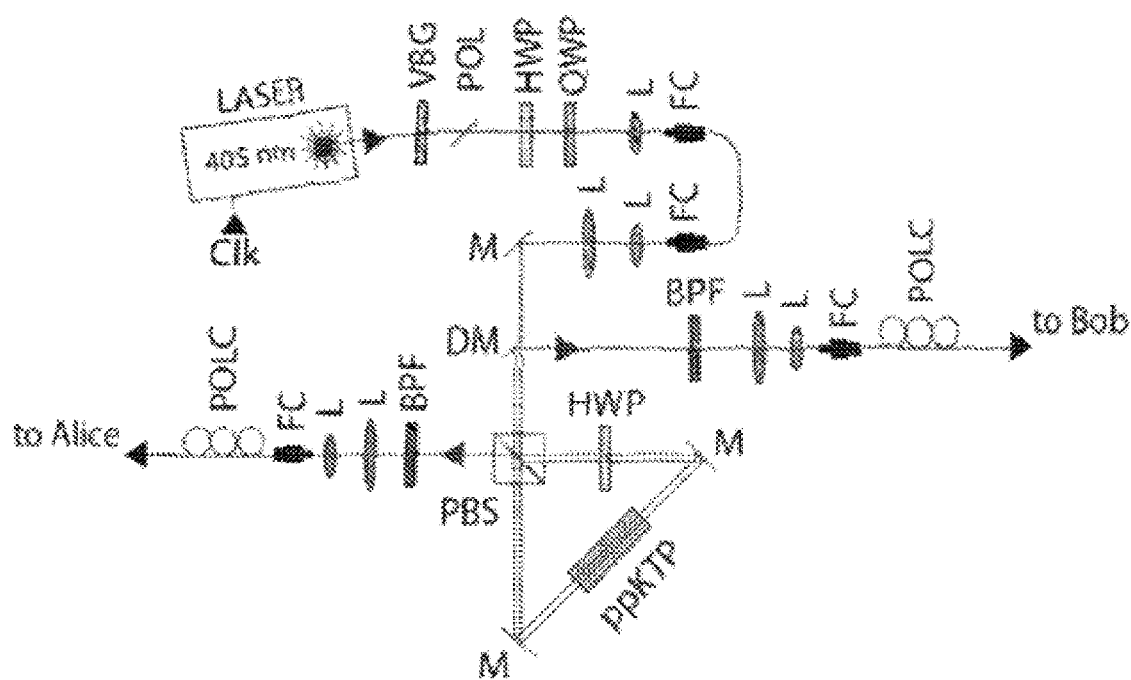
FIG. 1 shows a quantum entanglement source system.
Figure 2:
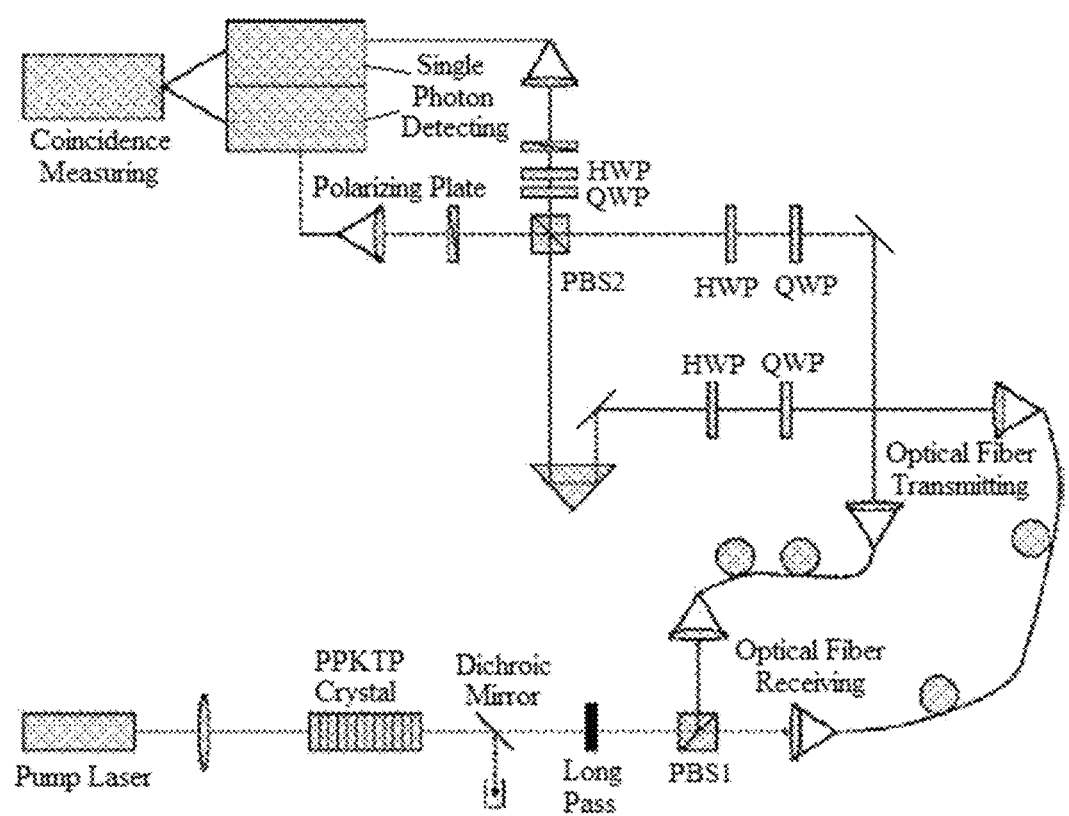
FIG. 2 shows another quantum entanglement source system.
Figure 3:
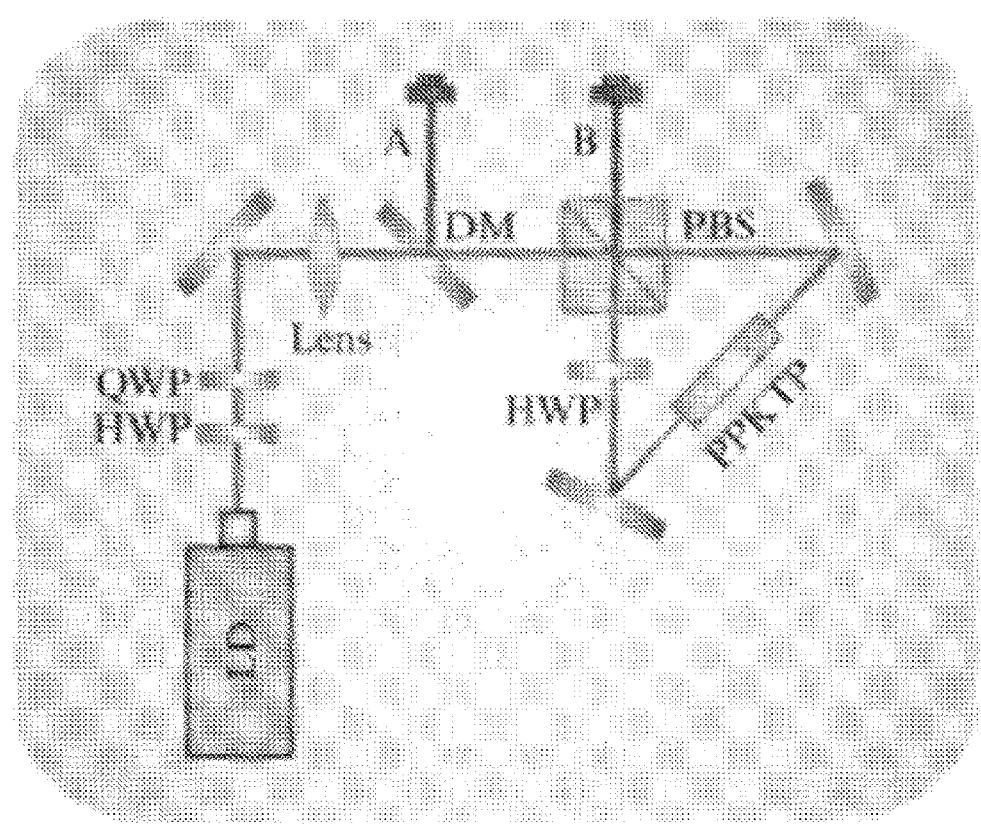
FIG. 3 shows yet another quantum entanglement source system.
Figure 4:
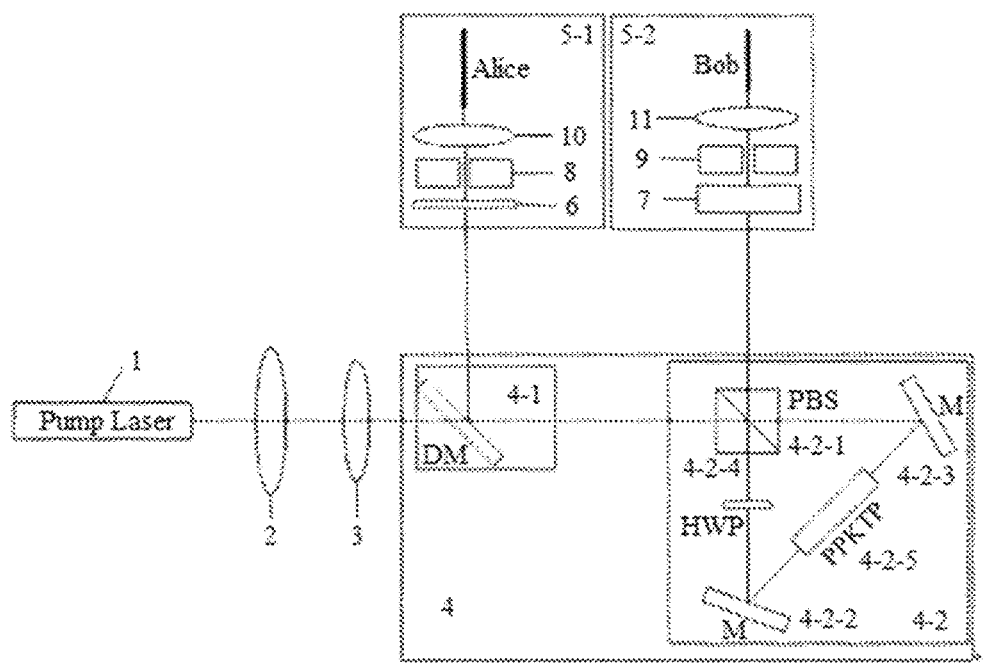
FIG. 4 is schematic structural diagram of an example of the entanglement source system according to the present disclosure.

FIG. 4 shows a schematic structural diagram of an example of an entanglement source system according to the present disclosure.

As shown in FIG. 4, the entanglement source system may include a pump light source 1, a pump light transmission module, an entanglement device 4, a first collection device 5-1 and a second collection device 5-2.

The pump light source 1 may be configured to output a polarized light, and may include, for example, a pump laser. For example, the pump light source 1 may include a pump laser with a wavelength of 405 nm.

The polarized light outputted from the pump light source 1 is inputted into the entanglement device 4 as the pump light of the entanglement device 4 after passing through the pump light transmission module.

In the embodiment shown in FIG. 4, the pump light transmission module may include a collimating device 2 and a focusing device 3.

In this embodiment, the collimating device 2 is configured to collimate the polarized light outputted from the pumping light source 1, and the focusing device 3 is configured to focus the polarized light.

For example, the collimating device 2 may include a collimating lens 2. The focusing device 3 may include a focusing lens.

In the example of FIG. 4, an output center of the pumping light source 1, a focal point of the collimating lens 2 and a focal point of the focusing lens 3 are arranged along a straight line. In some embodiments, the pumping light transmission module may also have other optical path structures and positional relationships, as long as the light outputted from the pumping light source 1 can be inputted into the entanglement device 4 in a desired state to serve as the pump light.

The entanglement device 4 may include a first optical element 4-1 and a Sagnac interference ring structure 4-2.

The first optical element 4-1 is configured to transmit a pump light, and reflect an entangled light. For example, the first optical element 4-1 may include a dichroic mirror (DM) 4-1.

The Sagnac interference ring structure 4-2 is configured to generate an entangled light, i.e., an entangled photon pair, based on the pump light by using the PPKTP crystal. In some embodiments, the entangled photon pair includes a signal light and an idler light with orthogonal polarization directions.

As shown in FIG. 4, for example, the Sagnac interference ring structure 4-2 may include a dual-wavelength polarizing beam splitter 4-2-1, a dual-wavelength half-wave plate 4-2-4, a first dual-wavelength reflector 4-2-2, a second dual-wavelength reflector 4-2-3 and a PPKTP crystal 4-2-5.

In this example, the pump light entering the entanglement device 4 after passing through the pump light transmission module is first transmitted to the polarizing beam splitter 4-2-1 through the dichroic mirror 4-1, and is decomposed into two polarized lights by the polarizing beam splitter 4-2-1. The two polarized lights enter a loop of the Sagnac interference ring, and propagate in the loop along opposite directions. During propagation in the loop, the two polarized lights pass through the half-wave plate 4-2-4, the reflectors 4-2-2, 4-2-3, and the PPKTP crystal 4-2-5, and simultaneously return to the polarizing beam splitter 4-2-1 after passing through the loop, then interference occurs at the polarizing beam splitter 4-2-1. The result of the interference is processed by the polarizing beam splitter 4-2-1 to be outputted from different ports (a reflection port and a transmission port) of the polarizing beam splitter 4-2-1, thus providing an entangled photon pair including a signal light and an idler light.

Referring back to FIG. 4, one of the signal light and the idler light is outputted from the polarizing beam splitter 4-2-1 and transmitted towards the second collection device 5-2, and the other is reflected by the dichroic mirror 4-1 and transmitted towards the first collection device 5-1.

According to the present disclosure, the first collection device 5-1 and the second collection device 5-2 are arranged with asymmetric device structures.

In one embodiment, the first collection device 5-1 may include a temporal filter unit 6, a spatial filter unit 8, and a first multi-mode optical fiber. The second collection device 5-2 may include a spatial filter unit 9, a stray light filter unit 7 and a second multi-mode optical fiber.

The temporal filter unit 6 is configured to perform temporal mode selection on the entangled light. In one embodiment, the temporal filter unit 6 may be implemented by a narrowband filter 6.

The spatial filter units 8 and 9 are configured to perform spatial mode selection on the entangled light. In one embodiment, the spatial filter units 8, 9 may be respectively implemented by diaphragms 8, 9.

The stray light filtering unit 7 is configured to filter stray lights other than the entangled light to provide a noise reduction function. For example, the stray light filter unit 7 may include a long pass filter 7.

According to the present disclosure, in order to improve the polarization contrast of the system while enabling multi-mode reception, the temporal filter unit 6 is arranged before the spatial filter unit 8 in the first collection device 5-1, as shown in FIG. 4. Therefore, by sequentially performing temporal filtering and spatial filtering on the entangled light in a collection device at one side, an entangled photon pair with high polarization contrast, high brightness, and high quality can be received in multi-mode. In addition, in the present disclosure, since the temporal filter unit and the spatial filter unit are only arranged in the collection device at one side (in the first collection device), and a temporal filter unit (for example, a narrow-band filter 6) and a stray light filter unit (for example, the long pass filter 7) may not be arranged in the collection device at the same side, comparing with the completely symmetrical device structures in the conventional art, the structure of the entanglement source system can be greatly simplified, to save resources, and easily obtaining high-quality entanglement sources in the experimental education environment.

Further, in the collection device of the present disclosure, a size of the aperture of each of the diaphragms 8 and 9 is related to the position of the diaphragm, and a large aperture of the diaphragm is required if the diaphragm is arranged close to the receiving port. Therefore, in the collection device of the present disclosure, the diaphragm may be arranged close to the receiving port.

It can be seen from experiments that if a narrow-band filter was not arranged in the collection device of the entanglement source system to temporally filter the entangled light first, the polarization contrast of the entangled source system will not change by only adjusting the size of the aperture and the distance of the diaphragm. In view of the above, the polarization contrast of the entanglement source system can be significantly improved by performing temporal mode selection through the narrowband filter 6 and then performing spatial mode selection through the diaphragm 8 on the entangled photons collected by the first collection device 5-1.

In one embodiment, the multi-mode fiber may be a 105-micron core multimode fiber. The narrowband filter may have a center wavelength of 810 nm and a full width at half maximum of 5 nm. The diaphragm may have an aperture of 1.5 mm. As mentioned above, the aperture of the diaphragm may be properly adjusted according to its position. In an embodiment, the entanglement source system of the present disclosure may also include a diaphragm positioning device for positioning the diaphragm. For example, in an embodiment of the diaphragm positioning device, the single-mode fiber may be used to collect entangled photons, and then the single-mode fiber may be used to transmit a red light, to facilitate positioning of the diaphragm.

In an embodiment, there may be two or more diaphragms in the collection device.

Further, collimation units 10 and 11 may also be arranged in the collection devices of the present disclosure for collimating the entangled light to be received by the multi-mode optical fiber, as shown in FIG. 4.

In an embodiment, the collimation units 10, 11 may each include a collimating lens.

In some embodiments, the entanglement source system of the present disclosure may be applied to experiments of laboratory courses for students (preparation/analysis of different entangled states, checking Bell's inequality, quantum state tomography measurement, quantum key distribution), scientific experiments (quantum optics, quantum communication, quantum information), and may also be applied to commercial applications (encryption, metrology, optical sensing).

For example, after collecting entangled photons through a multi-mode fiber, time-correlated single photon detection technology may be used for coincidence counting collection and polarization contrast may be measured, to obtain single photon counting, coincidence counting, and polarization contrast.

In an embodiment, when the entanglement source system is designed for scenarios of education or scientific research, a measurement device may be arranged in the entanglement source system according to the experimental requirements to measure the entangled photon pair, to select a polarization state, and subsequent experimental operations are performed to implement other experiments, such as checking Bell's inequality.

In an embodiment, a measuring device may be arranged between the entanglement device 4 and the collection devices 5-1, 5-2.

In the embodiment where the entanglement source system is used for education, the first collection device and/or second collection device may be provided with at least one of the narrowband filter, long pass filter and aperture for adjustment, to compare with other entanglement source systems, to determine, for example, the improvement of the performance of entangled light by spatial filtering and temporal filtering.

In view of the above, it can be seen that in the entanglement source system of the present disclosure, the polarization contrast can be significantly improved during multi-mode reception by performing dual filtering processing (in a sequence of temporal filtering and spatial filtering) on the entangled light only in the collection device at one side. Thus, the entanglement source system can achieve high-quality multi-mode reception with reduced components in a resource-saving way. The overall structure of the entanglement source system is simple, portable, and economical, and optical performance of the output is stable and the optical quality is high, achieving a significantly practical value in terms of education and science.

Further, since multi-mode reception is enabled, multi-mode fiber can be used in the entanglement source system to receive the entangled light, and the problems caused by single-mode fiber in the conventional art can be solved. In addition, the entanglement source system is portable and economical, and thus is suitable for applications of education and scientific research. Further, unlike the conventional small-sized entanglement source system with a completely symmetrical device structure and the fact of a low polarization contrast, in the present disclosure, temporal and spatial filter units are arranged only in a collection device at one side to form an asymmetric device structure, and the structure of the entanglement source system is further simplified, to save the optical resources to the greatest extent while improving the polarization contrast and brightness, having a significantly practical value in terms of education and science.

The invention claimed is:

1. A miniaturized Periodically Poled KTiOPO4 (PPKTP) crystal-based entanglement source system using multi-mode reception, comprising:
   a pump light source, a pump light transmission module, an entanglement device, a first collection device, and a second collection device, wherein
   a light outputted from the pump light source is inputted to the entanglement device as a pump light after passing through the pump light transmission module,
   the entanglement device is configured to generate an entangled light based on the pump light by using a PPKTP crystal, the entangled light comprises a signal light and an idler light, wherein polarization directions of the signal light and the idler light are orthogonal to each other,
   the first collection device is configured to receive one of the signal light and the idler light, and
   the second collection device is configured to receive another one of the signal light and the idler light; and wherein
   the first collection device and the second collection device are structurally asymmetric to each other,
   a temporal filter unit and a spatial filter unit are arranged in the first collection device, and the temporal filter unit is arranged before the spatial filter unit, and temporal filtering and spatial filtering are sequentially performed on one of the signal light and the idler light,
   a spatial filter unit is arranged in the second collection device, and
   the first collection device further comprises a first multi-mode optical fiber, and the second collection device further comprises a second multi-mode optical fiber.

2. The miniaturized PPKTP crystal-based entanglement source system using multi-mode reception according to claim 1, wherein the temporal filter unit comprises a narrowband filter, and/or the spatial filter unit comprises a diaphragm.

3. The miniaturized PPKTP crystal-based entanglement source system using multi-mode reception according to claim 2, wherein:
   at least one of the first multi-mode optical fiber and the second multi-mode optical fiber is a 105-micron core multi-mode optical fiber; and/or
   a wavelength of the pump light is 405 nm; and/or
   the narrowband filter has a center wavelength of 810 nm and a full width at half maximum of 5 nm; and/or
   the diaphragm has an aperture of 1.5 mm.

4. The miniaturized PPKTP crystal-based entanglement source system using multi-mode reception according to claim 2, wherein the number of the diaphragm in each of the first collection device and the second collection device is one, two, or more.

5. The miniaturized PPKTP crystal-based entanglement source system using multi-mode reception according to claim 1, wherein
   at least one of the first collection device and the second collection device further comprises a collimation unit for collimating the signal light or the idler light; and/or
   the second collection device further comprises a stray light filter unit for filtering out stray lights other than the signal light or the idler light.

6. The miniaturized PPKTP crystal-based entanglement source system using multi-mode reception according to claim 1, wherein the pump light transmission module comprises a collimating device and a focusing device.

7. The miniaturized PPKTP crystal-based entanglement source system using multi-mode reception according to claim 6, wherein the collimating device comprises a collimating lens; and/or the focusing device comprises a focusing lens.

8. The miniaturized PPKTP crystal-based entanglement source system using multi-mode reception according to claim 1, wherein the entanglement device comprises a first optical element and a Sagnac interference ring structure;
   the first optical element is configured to transmit the pump light and reflect the entangled light; and
   the Sagnac interference ring structure is configured to generate the entangled light based on the pump light by using the PPKTP crystal.

9. The miniaturized PPKTP crystal-based entanglement source system using multi-mode reception according to claim 8, wherein the first optical element comprises a dichroic mirror; and/or
   the Sagnac interference ring structure comprises a dual-wavelength polarizing beam splitter, a dual-wavelength half-wave plate, a first dual-wavelength reflector, a second dual-wavelength reflector and a PPKTP crystal.

10. The miniaturized PPKTP crystal-based entanglement source system using multi-mode reception according to claim 8, further comprising a measurement device, wherein the measurement device is arranged between the entanglement device and the collection device.

* * * * *